June 8, 1965  R. E. DAVIS  3,188,647
DATA RECORDER
Filed April 6, 1961  4 Sheets-Sheet 2
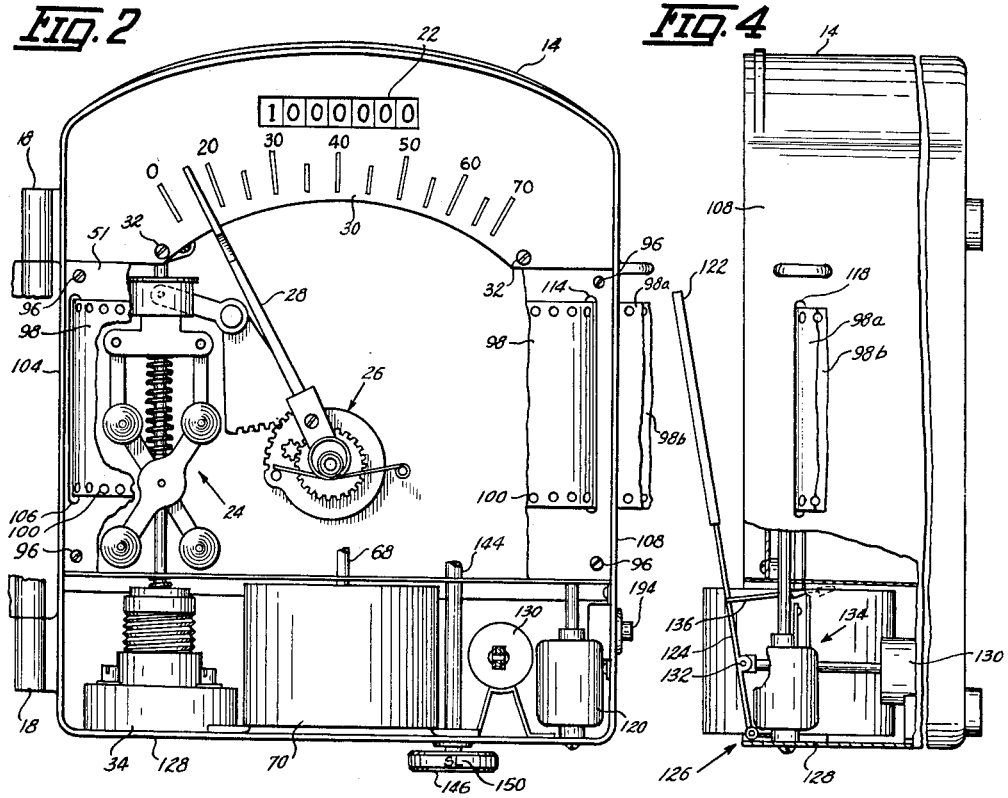
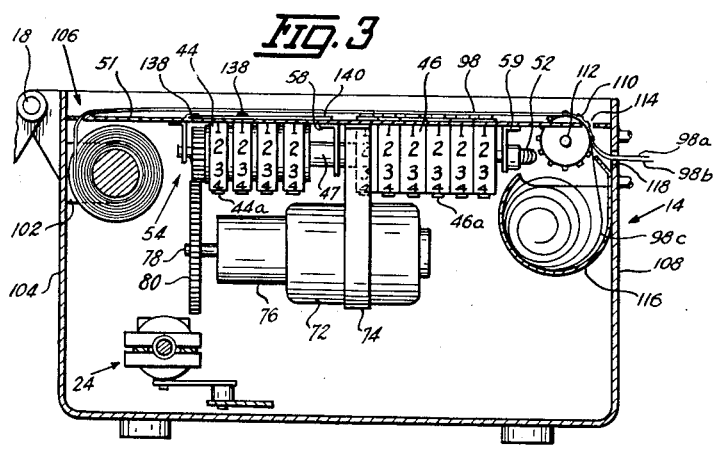
INVENTOR.
RAMONA E. DAVIS
BY Morton S. Adler
ATTORNEY.

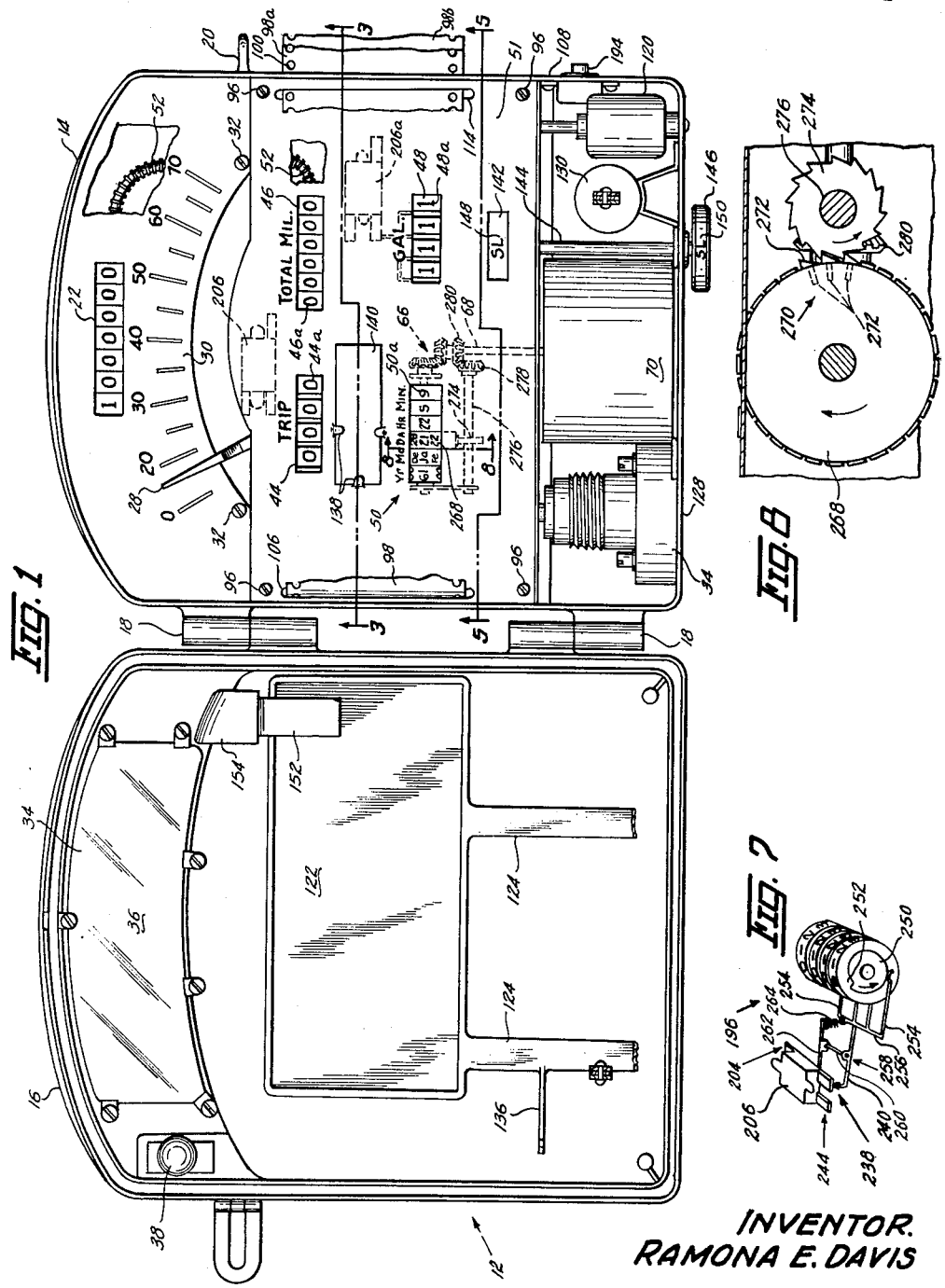

June 8, 1965 R. E. DAVIS 3,188,647
DATA RECORDER
Filed April 6, 1961 4 Sheets-Sheet 3
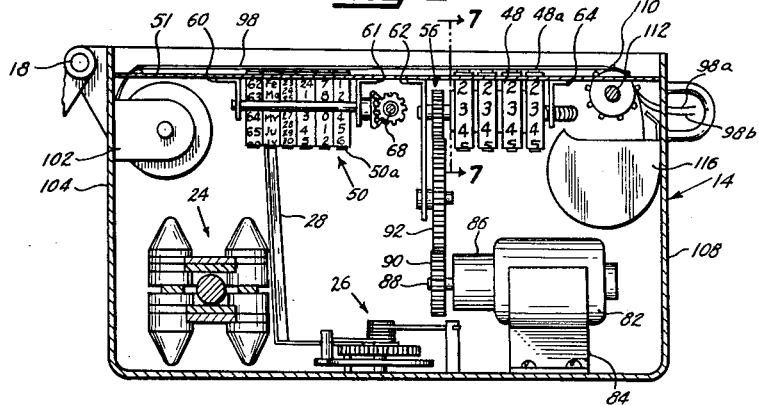
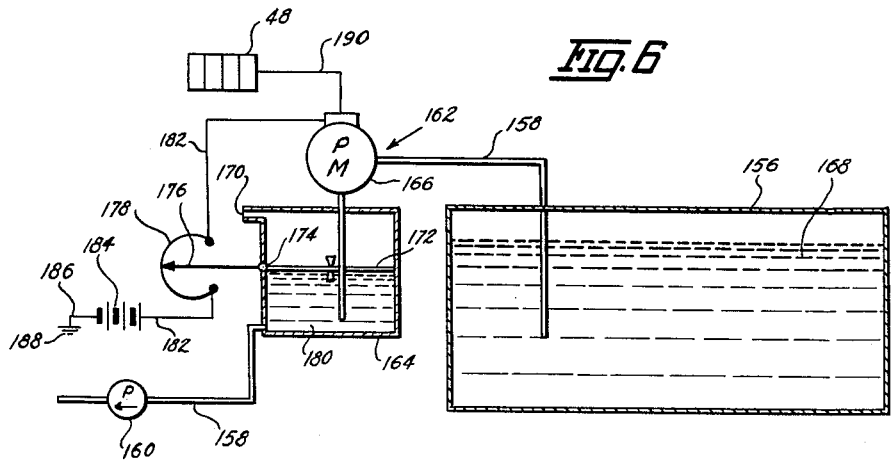
INVENTOR.
RAMONA E. DAVIS
BY Morton G. Adler
ATTORNEY.

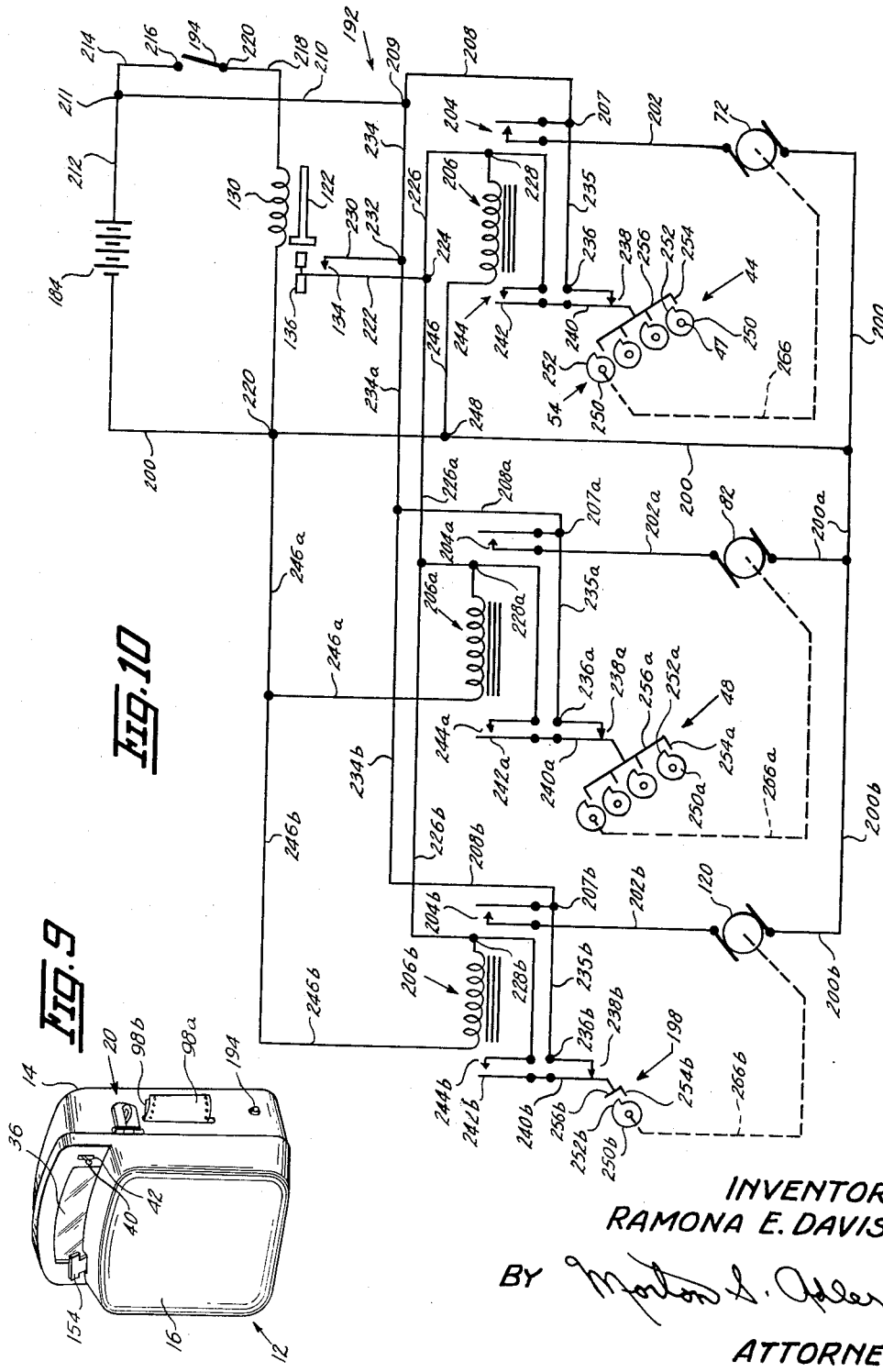

ated June 8, 1965

3,188,647
DATA RECORDER
Ramona E. Davis, P.O. Box 174, Stanhope, Iowa
Filed Apr. 6. 1961, Ser. No. 101,228
9 Claims. (Cl. 346—60)

This invention relates to a novel apparatus for recording and computing a variety of informational data and imprinting the same on a single permanent data sheet, and while it has been particularly designed for use by the trucking business, it is not intended to be limited thereto.

The records of gas consumption, driver working hours, miles traveled interstate, intrastate, on toll roads, between designated terminals, and many others, that are required of the owners and operators of trucking lines companies by federal and state regulatory authorities are myriad, and failure of the trucking lines to satisfy such authorities of the authenticity of the records kept can and does result not only in many inconveniences occasioned by lengthy and detailed audits but also, at times, in the revocation of necessary business permits with a resulting financial loss.

In interstate operations, for example, the payment by the trucking companies of various fees to the several states in which travel occurs is determined by records showing miles traveled in each state, gas consumed in each state, and miles traveled on toll roads which are free of certain fee requirements. In addition, many other items of information are necessary or desired by the operators and the authorities to determine if the truck drivers are complying with regulations as to hours behind the wheel, routes traveled etc. Such information as is required would appear at first blush not too difficult of securing by merely having each driver keep a proper log or record of time, dates and miles traveled, but experience over the years has demonstrated quite clearly that such a system of record keeping is very inaccurate and unsatisfactory, both from the viewpoint of the operators and the regulatory authorities. At least some of the reasons why present record keeping of such trucking operations is not satisfactory are due to the facts that the recording of data by the truck driver is not done at such times as to assure accuracy. For example, it is highly important to the operator and the authorities to know the exact truck mileage as a truck leaves one state and enters another; the exact mileage traveled on toll roads; the exact mileage between specified terminals, etc. Consequently, unless a driver records this data at the proper time, exactness is lost, and according to practice in general use, most of the required information is estimated at the end of a particular run and often not until the end of a complete round trip, and may not be done until after several trips if of relatively short distances. Since freight charges permitted by the operator may depend on specified mileage distances, such estimating can seriously involve the operators in alleged infraction of permit rights.

It is appreciated that even a conscientious driver cannot be expected to stop at state lines, which may be a busy bridge, or at every other site where data should be recorded, since he may have many other duties at the time in connection with his truck and its cargo, and for those drivers who may not be so conscientious, the present hit and miss methods of providing required information to the truck owners is aptly suited to errors and misinformation, both unintentional and intentional as experience has proved.

Having observed these problems over a period of years and having been directly involved in the problems of keeping records of the type described, I have devised an apparatus to overcome the several problems enumerated and which not only records the information desired at the right time and place, but also relieves the truck driver from the oneous task of keeping such records himself.

Accordingly, the instant invention contemplete the provision of a recording device to be mounted within the driver compartment of a truck and which will contain amongst other things a trip odometer, a pair of permanent odometers and a speedometer that can be connected directly to the standard speedometer cable and thereby substituted for the standard speedometer and odometer apparatus.

Another important object herein is to provide a novel fuel consumption measuring device in connection with the regular fuel tank and fuel line on a truck and so designed as to indicate the progressive volume of fuel consumption on an odometer type mechanism also located within the recording device referred to above.

It is also an object of this invention to provide with the recording device an electrically operated time clock and a manually operated symbol designating member on which can be placed any desired symbols to indicate such information as state lines, toll roads, destination points, etc. as may be required or desired by a particular user.

A further object of this invention resides in the feature of providing the time clock, trip odometer, one permanent odometer, gas recorder and symbol designator with raised characters together with the arrangement of a multiple copy carbon paper roll so positioned that it can be pressed against all the raised characters for recording the data there present at any given time.

Still another important object contemplated by this invention is the provision of an electrically operated printing plate for impressing the paper against the raised characters as indicated, together with an electric circuit, to be actuated by the truck driver, whereby upon the data being recorded, both the trip odometer and the gas consumption odometer are automatically reset to zero.

Still another object includes an improvement to a commercially available cylinder type time clock to automatically effect accurate registration of the proper date over an interval extending from the end of one month having less than thirty one days to the beginning of the following month.

Further objects and the more obvious advantages of this invention will be mentioned or else appear plainly from the description which follows.

FIG. 1 is a front elevational view of this data recorder shown with the cover open and having portions cut away to more clearly illustrate the construction thereof, FIG. 2 is a front elevational view with the cover, face plate and certain other parts removed to show parts located within the back portion thereof, FIG. 3 is a view, partially in section, taken from the line 3—3 of FIG. 1, FIG. 4 is a side elevational view showing the printing plate and also being broken away to illustrate the operating mechanism for such plate, FIG. 5 is a view similar to FIG. 3 but taken from the line 5—5 of FIG. 1, FIG. 6 is a schematic view illustrating the fuel consumption measuring apparatus, FIG. 7 is a perspective view taken on the line 7—7 of FIG. 1 and illustrating one of the like automatic deactuating mechanisms used with the resetting of the trip odometer and fuel consumption recorder, FIG. 8 is an enlarged cross sectional view taken on the line 8—8 of FIG. 1, FIG. 9 is a reduced perspective front view of this recorder in closed position ready for use, and FIG. 10 is a wiring diagram used with the printing, reset and paper moving parts of this invention.

Referring to the drawings a box-like housing is designated generally by the numeral 12 and preferably includes a relatively deep portion 14 to which a cover portion 16 is hingedly attached in any suitable manner as by pins 18. It will be understood that the form or shape of housing 12 is immaterial so long as it can be locked 20 against unauthorized opening as will later appear. In the main part 14 of housing 12 (FIG. 2) a permanent odometer 22 is mounted near the top center and will be connected in any conventional manner to a suitable speedometer mechanism indicated generally at 24. Mechanism 24 will also operate the speedometer needle assembly 26 with speedometer needle 28 moving across the calibrated speedometer face plate 30 which is removable by removing screws 32 and sliding the plate 30 upwardly and out of case side 14 to clear the free end of needle 28. Mechanism 24 is designed at end 34 to be attached to the usual speedometer cable (not shown) on a motor vehicle. No invention is claimed to the arrangement or operation of the speedometer 26, odometer 22 and its operating mechanism 24 and such parts are incorporated herein in order to permit the principal parts of this invention, as will be later described in detail, to be assembled into a unitary device which is susceptible of completely replacing or eliminating the customary speedometer and odometer on a vehicle. For this purpose, odometer 22 and needle 28 on plate 30 are visible through a window 34 in cover 16 whereas the principal parts of this invention, as will appear, are neither visible to nor accessible by the vehicle operator. Since member 12 is to be locked when in use, a light 38 is mounted on the inside of cover 16 adjacent window 36 and will be connected to the vehicle lighting system in a well known manner. Such light includes a manually operable switch 40 extending through slot 42 in cover 16. By such arrangement, needle 28 and odometer 22 can be illuminated for the information of the driver.

Coming now to the principal aspects of this invention, portion 14 of the housing 12 contains a conventional type trip odometer 44, a permanent odometer 46 the same as part 22, an odometer type and styled recording device 48 for recording fuel consumption and a cylinder type electric clock 50 of any suitable make. No invention per se is claimed in members 44, 46, 48 and 50 since they are commercially available but novelty is claimed in their arrangement, association and use as will later appear. Odometers 44 and 46 operate on a single shaft 47 (FIG. 3) in a well known manner and are driven by a flexible cable 52 connecting members 46 and 22. Members 44 and 48 both have the usual reset mechanisms (normally manually operated) represented here by the respective reset gears 54 and 56 and one of the objects herein is to provide a novel means of automatically resetting members 44 and 48 to zero at predetermined times. All members 44, 46, 48 and 50 are provided with raised characters or numbers designated respectively as 44a, 46a, 48a and 50a, for purposes of making a printed impression as will appear. Suitable bracketing or bracing 58, 59, 60, 61, 62 and 64 is used for supporting the respective members 44, 46, 48 and 50 from plate 51 (to be referred to later) in the relative positions shown in FIG. 1.

The clock 50 is connected by the bevel gear arrangement 66 through shaft 68 to a clock mechanism 70 that has a pressure actuated solenoid whereby the clock spring at a given point of unwinding actuates the solenoid to wind the spring and deactuates the solenoid at a given wound position. Such mechanism 70 is well known and is thus not shown in detail as no invention is claimed therein per se.

An electric motor 72 (FIG. 3) attached by a bracket 74 to plate 51 includes a gear reduction box 76 and shaft 78 on which there is a gear wheel 80 for meshing engagement with the reset gear 54 on the trip odometer 44. A similar arrangement for the fuel consumption recorder 48 (FIG. 5) includes the electric motor 82 on support 84, the gear reduction box 86, shaft 88, and gear wheel 90 in operable connection through gear wheel 92 with the reset gear 56. The wiring connections for these motors and other parts will be fully described later after the various elements involved and their relative positions and purpose have been set forth.

It will be understood that the raised characters or numerals 44a, 46a, 48a and 50a are all on the same plane as one of the objects herein is to obtain a printed impression of the respective readings at selected times. For describing the printing mechanism reference is made more particularly to FIGS. 3–5 where the face plate 51 is shown mounted across the center portion of housing side 14 and which contains suitable openings for registering with members 44, 46, 48 and 50. Plate 51 is attached by screws 96 to conveniently located studs or the like (not shown) secured within case portion 14. Extending across plate 51 over and closely adjacent to members 44, 46, 48 and 50 is a multi-layered strip of a carboned paper 98 or other suitable type susceptible of producing multiple copies of a given impression. Such paper 98 may be obtained in roll form with edge perforations 100 as in movie film and one end of such roll is rotatably arranged in a bracket 102 located just under plate 51 and attached to side 104 of case portion 14. Paper 98 is threaded through a slot 106 in plate 51, across plate 51 as described and at the opposite side near side 108 of case portion 14, the perforations 100 are engaged by a pair of spaced sprockets 110 on a spindle 112 before passing downwardly through a slot 114 in plate 51. In arranging paper 98 as described, the layers are manually separated so that as shown in FIG. 3 at least three sheets 98a, 98b and 98c are defined, such sheets being their relative position from top to bottom. The lowermost sheet 98c is trained into an arcuate collector 116 located just under plate 51 near side 108 where it will roll up as paper 98 moves across plate 51. Collector 116 is open at the side or end adjacent plate 30 for purposes of removal as will be described later in more detail. The two upper layers, 98a and 98b are trained out of a slot 118 in side 108 where they can be severed by the truck driver. Sprocket wheels 110 are driven by a geared down electric motor 120 mounted to side 108.

With reference now to FIG. 4, a printing plate 122, preferably of rubber or the like, is carried by a pair of arms 124 hingedly attached at one end to the forward edge 126 of bottom 128 of member 14 and so arranged as to extend over paper 98 in a position to impress such paper against the various characters, numbers and indicia to be imprinted. The raising and lowering of printing plate 122 is accomplished by a solenoid 130 mounted as shown and pivotally connected to one of the arms 124 as indicated at 132. Solenoid 130 includes a normally open momentary contact switch member 134 that is momentarily closed by a plunger 136 on one of the arms 124 only on its upward direction of travel as viewed in FIG. 4.

It is intended that certain other data be imprinted on paper 98 in addition to that represented by members 44, 46, 48 and 50 and for such purposes plate 51 carries suitably arranged small clips 138 for retaining a thin plate 140 containing any symbol or indicia that a particular user may desire or require. In addition, a single cylinder 142 rotatable through a suitable slot in plate 51 is connected to a shaft 144 that terminates below and outside of case bottom 128 in a manually operated knob or dial 146. Cylinder 142 will have a plurality of different letters or symbols such as the SL 148 shown and dial 146 will have corresponding indicia 150 visible to the truck operator. The symbol SL for example represents State Line, and other symbols such as TR for toll road, HS for home station, TD for trip destination and others can be provided according to requirements of the user. There is also provided a truack means 152 through cover 16 near window 36 into which a flat key 154 carrying the raised initials of the driver on duty can be inserted, and also removed from by such driver to identify himself with the printed record on paper 98. Such track is arranged to position key 154 when inserted, above plate 51 and beneath paper 98.

Thus far described it will be understood that the trip and permanent odometers 44 and 46 will operate simultaneously and in the same manner as odometer 22 which will be connected to the speedometer cable (not shown) on a vehicle in any conventional manner. Also, clock 50 will run continuously as indicated. The fuel consumption recorder 48 is operated by a novel apparatus for which reference is now made to FIG. 6.

The regular fuel tank of a vehicle is designated by the numeral 156 and the regular fuel line and fuel pump are indicated by the respective numerals 158 and 160. Normally line 158 would connect pump 160 directly to tank 156 but for purposes of this invention I have interposed a fuel metering assembly 162 between pump 160 and tank 156 in line 158. Such assembly preferably includes a separate fuel tank 164 substantially smaller than the regular tank 156 although tank 156 alone could be used with slight modifications. However, since assembly 162 is susceptible of quick attachment to presently installed tanks 156 it is preferred for economy in its adoption. The size of tank 164 may be varied but one with a capacity of two to five gallons is adequate. A metering pump 166 is mounted preferably to the top of tank 164 so that one end of line 158 draws fuel 168 from tank 156, through pump 166 and into tank 164 which is vented as at 170. The other end of line 158 connects tank 164 to pump 160 which will deliver the fuel to the carburetor (not shown) in a well known manner. A float member 172 in tank 164 is hingedly secured as at 174 to one of the sides of tank 164 and the needle 176 of a rehostat 178 is suitably connected to float 172 at hinge point 174 so as to be moved by the relative movement of the float responsive to the level of fluid 180 in tank 164. Rheostat 178 is imposed in the electric lead 182 of which one end connects with the metering pump 166 and the other end extends to the usual vehicle battery 184 from which lead 186 runs to a ground 188. Rheostat 178 is designed to decrease current to pump 166 as float 172 rises and to increase current to such motor as float 172 falls whereby pump 166 will operate to maintain an adequate supply of fuel 180 in tank 164. At a predetermined elevated point of the float, the rheostat 178 will operate to completely shut off current to the pump so that it will cease operation. Pump 166 includes a flexible cable means 190 operably connected to the fuel recording device 48 which will accordingly register the amount of fuel pumped from tank 156 into 164. Pump 166 is commercially available and while no invention is claimed in the pump per se, its use and association with the tanks 156 and 164, rheostat 178 and member 48 as described and for the purpose indicated is claimed as novel.

An electric circuit designated generally by the numeral 192 in FIG. 10 is employed to operate motors 72, 82 and 120 and includes the normally open push button type switch 194 accessible from the outside of housing 12 at the bottom 128. To better understand the operation of circuit 192 of which a description will follow later, I will first describe the general sequence of operation which this recorder is designed to accomplish.

When a driver takes over a vehicle, he will insert his key 154 carrying his own initials or other identifying symbol into track 152 so that all impressions on paper 98 while he is responsible for the vehicle will be imprinted with the other data recorded. Key 154 can be inserted without unlocking housing 12 and it is contemplated that the truck owner or his representative will be the only one having access to the interior of the housing 12. The truck driver will also manually set dial 146 to the particular symbol 150 at each time a recording is to be made to identify the particular record according to the nature of symbols 150. Adjustment of dial 146 will of course correspondingly adjust symbols 148 on cylinder 142. It will thus be seen that key 154 and dial 146 are the only parts of the record within the control of the driver.

At predetermined points such as beginning and end of toll roads, State lines, destinations and any others determined by the owners, the driver will depress and release switch 194 which during its momentary closed position will energize circuit 192 and result in the following sequence of events. Printing plate will impress paper 98 against the various devices on plate 51 having data for recording. These include members 44, 46, 48, 50, 140, 142 and 154. As soon as the proper impressions are made on paper 98, the reset gears 54 and 56 on members 44 and 48 respectively are set in operation by the respective motors 72 and 82 and also the sprocket wheels 110 are set in motion by motor 120. Operation of the reset gears 54 and 56 will align all corresponding numerals on members 44 and 48 in a well known manner and since this is normally manually accomplished, the stopping of members 44 and 48 on ordinary odometers at a zero setting is done by the one turning the reset shaft. However, since members 44 and 48 will be inaccessible to the driver, and since bookkeeping will be greatly facilitated by starting each new record at zero, I have devised apparatus to automatically deactuate motors 72 and 82 at a point where members 44 and 46 have a zero reading after each impression taken. Such apparatus is indicated generally at 196 in FIG. 7, is duplicated for motors 72 and 82 and will be fully described in the description of circuit 192.

Motor 120 will rotate sprockets 110 sufficiently to clear all printed matter from plate 51 and thus leave clean paper for the next impression. Sprockets 110 are of sufficient diameter so that one rotation is sufficient for moving paper 98 the required distance and includes means 198 (FIG. 10) for breaking the circuit to motor 120 at the required interval of rotation. Paper 98 moved by sprockets 110 will be trained into collector 116 and out of slot 118 as previously described. Records in collector 116 can only be removed by the one having access to the interior of housing 12 and the records passing through slot 118 are available to the driver. With the operations as described, this device is set for another recording when switch 194 is closed and the sequence of events described is repeated.

With reference now to FIG. 10 and the circuit 192 indicated, it is pointed out that motors 72 (trip odometer reset), 82 (fuel recorder reset), and 120 (paper drive) are on parallel like circuits and operate in a like manner so that the circuit of motor 72 will be first described and then the other two related thereto.

One side of motor 72 is connected by lead 200 to the negative side of the vehicle battery 184. The other side of motor 72 is connected by lead 202 to a normally open contact point 204 on a holding relay 206, and contact 204 connects through terminal 207 to lead 208 through terminal 209 to lead 210 through terminal 211 to line 212 running to the positive side of battery 184. Line 214 runs from terminal 211 to terminal 216 at one side of switch 194 and line 218 extends from terminal 220 at the other side of switch 194 through solenoid 130 to terminal 220 in lead 200. Thus closing of switch 194 will actuate solenoid 130 to move the printing plate 122 downwardly and upon the upward movement of plate 122 due to deactuation of solenoid by release of switch 194, plunger 136 momentarily closes switch 134 to energize the holding relay 206. This is accomplished by lead 222 on switch 134 running to terminal 224 which is connected by lead 226 to terminal 228 at one side of relay 206. Lead 230 of switch 134 extends to terminal 232 and then through lead 234 to terminal 209 through lead 208 to terminal 207 through lead 235 to terminal 236 at the other side of relay 206 where it is connected through the normally closed switch 238 to a switch breaker arm 240. Arm 240 at end 242 provides the normally open contact 244 at said other side of relay 206, and from such side relay 206 connects by lead 246 to terminal 248 in lead 200. Thus the momentary closing of switch 134 energizes relay 206 by closing contacts 204 and 244 and motor 72 starts operation, being connected to the positive side of the battery through lead 212 terminal 211 lead, 208, switch 204 and lead 202, and to the negative side of the battery through lead 200. Relay 206 remains energized after opening of switch 134, being connected from the plus to minus side of the battery 184 through lead 212, terminal 211, lead 210, terminal 209 lead 208, terminal 207, through lead 235 to terminal 236 contact 238, line 240, switch 244 and lead 246 to terminal 248 in lead 200. Deactuation of motor 72 is effected by the opening of contact 238 which breaks the circuit to relay 206 and opens contacts 204 and 244. Contact 238 is opened as follows with reference being made particularly to FIG. 7 and the circuit of motor 72 in FIG. 10.

On one side of each cylinder of the trip odometer 44 I have provided a cam means 250 which includes a detent 252 to provide an abrupt drop or depression in the cam surface as shown. Cam 250 may be in the form of an integral shoulderlike projection or a separately attached member so long as it is designed to rotate with the respective cylinders of member 40. The detents 252 are arranged so that they are all in alignment when the corresponding numerals on the cylinders of member 44 are aligned. Each cam 250 is engaged by a respective finger 254 and all of said fingers are attached to a common support bar 256 which is secured to one end of the switch breaker arm 240. The other end 242 of arm 240, as described above, serves to maintain switch 238 in a normally closed position and this is accomplished as follows. Arm 240 is pivotally or rockably mounted intermediate its ends to a pivot point 258 on rod 260 supported by a bar or the like 262 secured to relay 206. As shown in FIG. 7, fingers 254 engage the cams 250 from the bottom side and thus I use a spring 264 extending from the outer end of member 262 to arm 240 intermediate support 256 and pivot point 258 to normally urge the fingers 254 into contact with the cams 250. By this arrangement it will be appreciated that as motor 72 operates it will eventually align all corresponding numerals on member 44 because of the nature of the conventional reset mechanism. This will also align all detents 252 which as shown are substantially diametrically opposite to the zero settings since fingers 254 are preferably at the bottom and accordingly when the aligned detents 252 reach fingers 254, such fingers are all urged into the depressions adjacent the detents. This causes arm 240 to rock on pivot point 258 which opens switch 238 breaking the circuit to relay 206 and opens contact 204 (also 244) to stop motor 72. The dotted line 266 in the circuit for motor 72 (FIG. 10) merely designates the drive connection between motor 72 and member 44. As soon as member 44 starts operation, the movement of cam 250 on one cylinder, being the tenth of a mile indicator, will act on one finger 254 to move it from its switch breaking position and since all fingers 254 are connected to the common support 256, all fingers are moved by arm 240 rocking on point 258 to close switch 238. It will be understood that fingers 254 may contact cams 250 at a different relative position than that described whereby detents 252 would be correspondingly relocated without in any way departing from the principle here disclosed. For example if fingers 254 were at the top of the cams they could drop by gravity into the cam depressions without requiring a spring 264, but I prefer the embodiment described for more accurate and position action.

Further referring to FIG. 10, it is pointed out that the circuitry relative to motors 82 and 120 for starting and stopping such motors is a duplicate of the circuit described for motor 72 and by suitable leads are connected to corresponding sides of battery 184 and to corresponding sides of switch 134. Consequently to avoid unnecessary repetition of circuit description, the leads and contacts in the circuit for motor 82 are given the same numerals as for the motor 72 followed by the letter $a$ and followed by the letter $b$ for motor 120. It will be noted, however, that from the plus side of battery 184, lead 212 through terminal 211 through lead 210 to terminal 209 are common to the circuits for motors 72, 82 and 120.

Since one of the principal objects herein is to provide for the recording of important data, as described, under circumstances where the tampering with data indicia is not within the control of the truck driver, it will be appreciated that at times a given vehicle may be on the road at a time corresponding to the end of one month and beginning of the next. Consequently since all months do not have the same number of days, the printed date from clock 50 would not normally record the proper first day of a month following a thirty or twenty eight day month, for example. To avoid bookkeeping confusion which would result from such erroneous recording under circumstances indicated, I have provided an improvement to clock 50 which overcomes the problem.

With reference to FIGS. 1 and 8, I have identified the date or day cylinder of clock 50 more particularly by the numeral 268 and cylinder 268 will contain numerals 1–31 in sequence in the customary manner. However, for each numeral 29, 30 and 31 on cylinder 268 designated as group generally by 270 in FIG. 8 I have made a removably insertable boss, pawl or dog 272 which when inserted as shown will effect a meshing engagement with a continually rotating gear wheel 274 connected to a shaft 276 on which a bevel gear 278 is in mesh with a second bevel gear 280 on clock shaft 68. Since shaft 68 is always in operation to run clock 50, gear wheel 274 will likewise be in continual rotation closely adjacent cylinder 268. In utilizing this arrangement, assume a given month has only thirty days and that perhaps a given truck is leaving on the twenty ninth to return on the second of the next month. The person with access to housing 12 manually inserts a dog 272 for the thirty first day which the given month does not have. With this done, as cylinder 268 moves past the thirtieth day, dog 272 is engaged by gear wheel 274 and cylinder 268 is rotated past the thirty first reading into the correct number one for the first day of the next month. If a twenty eight day month is involved, dogs 272 for the twenty ninth, thirtieth and thirty first would be used.

It will of course be necessary from time to time to replenish the supply of paper 98 or to remove the records accumulated in collector 116 and for this purpose it is only necessary to remove plate 30 as previously described whereby access to the roll ends of paper 98 at opposite sides of plate 51 is readily accessible from below the upper or top edge of plate 51.

It will be appreciated from the above description that this recorder will provide a permanent and accurate record of a variety of necessary and required information under circumstances that will substantially minimize, if not eliminate, various existing problems concerned not only with proper record keeping for the benefit of truck owners but also in the matter of satisfying regulatory authorities as to the record basis upon which different types of fees are computed. In the device which I have described it should be undestood that the odometer 22 and speedometer members 24, 26 and 28 are not a part of nor essential to this invention since in the absence of such parts, member 46 would be attached to the vehicle speedometer by a suitable adapter. However, since the nature and type of this recorder lends itself to association with odometer 22 and speedometer parts 24, 26 and 28, I have included such items in a unitary assemblage which provide a convenient and useful combined unit for the benefit of the users.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. In a recording device to be mounted on a truck, the combination of a housing, an odometer type data providing mechanism in said housing, means connecting said mechanism to the speedometer cable of the truck for synchronized operation therewith, reset gearing on said mechanism, an electric motor operably connected to said mechanism, an electric circuit including a normally open holding relay, a switch breaker means associated with said relay, a momentarily acting normally open switch connected to said relay, solenoid actuated printing means operable relative to said mechanism, means on said printing means after the completion of a printing operation to close said momentary switch so as to energize said holding relay and actuate said motor, means on said mechanism operatively connected to said relay to act upon said switch breaker means to de-energize said holding relay at a pre-determined time and thereby terminate operation of said motor, and manually operable switch means exteriorly of said housing for actuating said solenoid.

2. In a recording device to be mounted on a truck, the combination of a housing, an odometer type data providing mechanism in said housing operatively connected to fuel metering means associated with the fuel line, reset gearing on said mechanism, an electric motor operably connected to said mechanism, an electric circuit including a normally open holding relay, a switch breaker means associated with said relay, a momentarily acting normally open switch connected to said relay, solenoid actuated printing means operable relative to said mechanism, means on said printing means after the completion of a printing operation to close said momentary switch so as to energize said holding relay and actuate said motor, means on said mechanism operatively connected to said relay to act upon said switch breaker means to de-energize said holding relay at a predetermined time and thereby terminate operation of said motor, and manually operable switch means exteriorly of said housing for actuating said solenoid.

3. In a data recording device, the combination of a housing, an odometer mounted within said housing and adapted for operable connection to the speedometer cable on a vehicle, said odometer including raised numerals and reset gearing, a roll of paper capable of reproducing an impression, said paper trained over said raised numerals, means at each side of said housing for supporting said roll of paper, a printing plate, hinge means on said housing normally supporting said printing plate in spaced relationship above said paper, an electric motor, gearing carried by said motor engaged with said reset gearing for operating said reset mechanism, an electric circuit, a manually actuated solenoid in said circuit connected to said printing plate for momentarily moving said printing plate into contact with said paper and impressing said paper against said numerals, a holding relay in said circuit and connected to said motor, a momentary switch connected to said holding relay, a switch means in said circuit acted upon by said printing plate only on its movement away from said paper after a printing operation to actuate said holding relay and thereby actuate said motor and means synchronized with said odometer to break the circuit to said holding relay and thereby de-actuate said motor at a pre-determined point.

4. In a data recording device, the combination of a housing, an odometer mounted within said housing and adapted for operable connection to the speedometer cable on a vehicle, said odometer including raised numerals and reset gearing, a roll of paper capable of reproducing an impression, said paper trained over said raised numerals, means at each side of said housing for supporting said roll of paper, a printing plate, hinge means on said housing normally supporting said printing plate in spaced relationship above said paper, an electric motor, gearing carried by said motor engaged with said reset gearing for operating said reset mechanism, a manually actuated solenoid connected to said printing plate for momentarily moving said printing plate into contact with said paper and impressing said paper against said numerals, an electric circuit including said solenoid and said motor, a switch means in said circuit acted upon by said printing plate only on its movement away from said paper after a printing operation to actuate said motor, means synchronized with said odometer to break the circuit to said motor at a predetermined point, a multi-cylinder type electric clock on which all cylinders have raised symbols capable of making a printed impression, said cylinders disposed below said paper, one of said clock cylinders having consecutive numerals of 1–31 for designating days of the month, respective dogs demovably insertable in the numerical designations for 29, 30, 31 of said clock cylinder, a gear wheel, means for continually rotating said gear wheel in close proximity to said clock cylinder, and said dogs when inserted in said clock cylinder being engaged by said gear wheel to correspondingly move said clock cylinder according to the number of dogs used.

5. A device as defined in claim 4 including a rotatable shaft within said housing and having one end extending exteriorly thereof, a cylinder on said shaft within said housing including a plurality of spaced raised indicia on the periphery thereof and disposed for being engaged by said paper under pressure of said printing plate, a manually operable dial on the exterior end of said shaft, indicia on said dial of like representations and correspondingly arranged as on said cylinder, rotation of said dial effecting corresponding rotation of said cylinder, said indicia being the only data subject to manual manipulation in the normal use of said recording device.

6. A recording device to be mounted on a truck for recording a variety of information relative to the operation thereof, comprising a housing, a plurality of odometer type data providing mechanisms in said housing of which some are connected to the speedometer cable of the truck for synchronized operation therewith and one of which is operatively connected to fuel metering means associated with the fuel line, some of said data mechanisms being provided with reset gearing, an electric motor for each data mechanism having reset gearing, said respective motors including gear connection to one of said data mechanisms, an electric circuit including a normally open holding relay for each motor, a switch breaker means associated with each relay, a momentarily acting normally open switch connected to all of said relays, solenoid actuated printing means operable relative to all of said data mechanisms simultaneously, means on said printing means after the completion of a printing operation to close said momentary switch so as to energize all of said respective holding relays and simultaneously actuate said motors, means on each respective data mechanism operatively connected to one of said respective holding relays to act upon its respective switch breaker means to de-energize said holding relay at a predetermined time and thereby terminate operation of the respective motor connected thereto, and manually operable switch means exteriorly of said housing for actuating said solenoid.

7. In a data recording device, the combination of a housing, an odometer mounted within said housing and adapted for operable connection to the speedometer cable on a vehicle, said odometer including raised numerals and also having a reset mechanism, a roll of paper capable of reproducing an impression, said paper trained over said raised numerals, means at each side of said housing for supporting said roll of paper, a printing plate, hinge means on said housing normally supporting said printing plate in spaced relationship above said paper, an electric circuit including a solenoid connected to said printing plate for moving the same against said paper, an electric motor operably connected to said reset mechanism for actuating the same, a normally closed switch in series with said motor, a normally open switch connected to said solenoid, a holding relay in series with said motor and said normally closed switch, said holding relay connected to the source of current in said circuit, a momentary switch connected to said holding relay and source of current, means on said printing plate to momentarily close said momentary switch during its movement away from said paper upon deactuation of said solenoid to thereby energize said holding relay and actuate said motor, a cam means associated with said odometer, a movable switch breaker member attached to said normally closed switch, and said cam means acting at a predetermined interval on said switch breaker member to open said normally closed switch and deactuate said motor.

3. In a data recording device, the combination of a housing, an odometer mounted within said housing and adapted for operable connection to the speedometer cable on a vheicle, said odometer including raised numerals and also having a reset mechanism, a roll of paper capable of reproducing an impression, said paper trained over said raised numerals, means at each side of said housing for supporting said roll of paper, a printing plate, hinge means on said housing normally supporting said printing plate in spaced relationship above said paper, an electric circuit including a solenoid connected to said printing plate for moving the same against said paper, an electric motor having a driven gear engaged with said reset mechanism, a holding relay having first and second normally open contacts connected to the source of electric current and a third normally closed contact in series with said first and second contact, said motor being connected to said first contact, a switch breaker member connected to said third contact, a momentary normally open switch connected to said holding relay, means on said printing plate to momentarily close said momentary switch upon deactuation of said solenoid to energize said holding relay and actuate said electric motor, manually operated switch means for actuating and deactuating said solenoid, cam means on said odometer connected to said switch breaker member, and said cam means acting at a predetermined interval on said switch breaker member to open said third contact and deactuate said holding relay and correspondingly deactuate said electric motor.

9. In a data recording device, the combination of a housing, an odometer mounted within said housing and adapted for operable connection to the speedometer cable on a vehicle, said odometer including raised numerals and also having a reset mechanism, a roll of multiple layer paper capable of producing multiple copies of an impression, said paper trained over said raised numerals, means at one side of said housing for rollably supporting one end of said roll of paper, a printing plate, hinge means on said housing normally supporting said printing plate in spaced relationship above said paper, a spindle at the opposite side of said housing engaging said paper for moving the same across said numerals at times, an electric circuit including a first electric motor operably connected to said reset mechanism for actuating the same, a second electric motor operably connected to said spindle for rotating the same, first and second normally closed switches in parallel with each other and in series respectively with said first and second electric motors, first and second normally open switches in parallel with each other and in series respectively with said first and second electric motors and said first and second normally closed switches, means on said printing plate to close said normally open switches as said printing plate moves away from said paper upon deactuation of said solenoid whereby said motors are actuated, a first and second cam means associated with said odometer, respective switch breaker members attached to said normally closed switches respecitvely, and said cam means acting independently at a predetermined interval on said respective switch breaker members to open said normally closed switches and deactuate said motors.

References Cited by the Examiner
UNITED STATES PATENTS

| | | | |
|---|---|---|---|
| 1,048,503 | 12/12 | Dennis | 346—60 |
| 1,672,882 | 6/28 | Dudley | 235—144 |
| 1,858,397 | 5/32 | Friden | 235—144 |
| 2,153,185 | 4/39 | Harrison | 346—60 |
| 2,172,511 | 9/39 | Johnson et al. | 346—60 X |
| 2,293,934 | 8/42 | Cooper | 346—98 |
| 2,360,273 | 10/44 | Pritchard | 222—30 X |
| 2,392,467 | 1/46 | Engel et al. | 346—60 X |
| 2,538,243 | 1/51 | Hazard et al. | |
| 2,617,706 | 11/52 | Jeffrey | 346—94 |
| 2,669,869 | 2/54 | Weber | 73—113 |
| 2,876,639 | 3/59 | Loizzo et al. | 73—113 |
| 2,935,229 | 5/60 | Robinson. | |

LEYLAND M. MARTIN, *Primary Examiner.*

BERNARD KONICK, EMIL G. ANDERSON, LEO SMILOW, *Examiners.*